United States Patent
Borrelli et al.

(10) Patent No.: US 10,393,934 B2
(45) Date of Patent: Aug. 27, 2019

(54) MULTI-PANE WINDOW WITH A LOW EMISSIVITY LAYER AND A PHOTOCHROMIC GLASS

(71) Applicant: Corning Incorporated, Corning, NY (US)

(72) Inventors: Nicholas Francis Borrelli, Elmira, NY (US); Nadja Teresia Lönnroth, Corning, NY (US); Michel Prassas, Fontainebleau (FR); Paul Michael Then, Victor, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/259,572

(22) Filed: Sep. 8, 2016

(65) Prior Publication Data

US 2017/0075049 A1    Mar. 16, 2017

Related U.S. Application Data

(60) Provisional application No. 62/217,123, filed on Sep. 11, 2015.

(51) Int. Cl.
*G02B 5/28* (2006.01)
*G02B 5/23* (2006.01)
(Continued)

(52) U.S. Cl.
CPC ........ *G02B 5/282* (2013.01); *B32B 17/10055* (2013.01); *B32B 17/10119* (2013.01);
(Continued)

(58) Field of Classification Search
CPC .. C03C 3/093; C03C 3/11; C03C 4/06; C03C 17/366; C03C 17/36; G02B 5/282;
(Continued)

(56) References Cited

U.S. PATENT DOCUMENTS

| 2,444,976 A | 4/1942 | Brown |
| 3,406,085 A | 10/1968 | Brown et al. |

(Continued)

FOREIGN PATENT DOCUMENTS

| CN | 103524055 A | 1/2014 |
| CN | 204002374 U | 12/2014 |

OTHER PUBLICATIONS

International Search Report and Written Opinion PCT/US2016/050745 dated Dec. 12, 2016.
(Continued)

*Primary Examiner* — Kristina M Deherrera
(74) *Attorney, Agent, or Firm* — Svetlana Short

(57) ABSTRACT

A multi-pane window having a low emissivity layer and a photochromic glass. The window includes at least two panes of glass. An outside pane for interaction with the outdoors and an inside pane spaced apart from the outside pane. The outside pane includes a low emissivity coating. The inside pane includes a photochromic glass. The outside pane transmits solar light wavelengths. The photochromic glass is darkened upon exposure to light transmitted by the outside pane.

30 Claims, 11 Drawing Sheets

(51) Int. Cl.
*E06B 9/24* (2006.01)
*C03C 3/093* (2006.01)
*C03C 3/11* (2006.01)
*C03C 4/06* (2006.01)
*C03C 17/36* (2006.01)
*B32B 17/10* (2006.01)
*E06B 3/67* (2006.01)

(52) U.S. Cl.
CPC .. *B32B 17/10174* (2013.01); *B32B 17/10486* (2013.01); *C03C 3/093* (2013.01); *C03C 3/11* (2013.01); *C03C 4/06* (2013.01); *C03C 17/366* (2013.01); *E06B 9/24* (2013.01); *G02B 5/23* (2013.01); *G02B 5/285* (2013.01); *E06B 3/6715* (2013.01); *E06B 2009/2417* (2013.01); *E06B 2009/2464* (2013.01)

(58) Field of Classification Search
CPC .......... G02B 5/285; G02B 5/23; G02B 5/208; G02B 5/0205; E06B 2009/2417; E06B 2009/2464; G02C 7/02; G02C 7/102; B60R 1/088; G02F 1/1533; G02F 1/157
USPC .............................. 359/359–360; 351/159.03, 351/159.61–159.62
See application file for complete search history.

(56) References Cited

U.S. PATENT DOCUMENTS

| | | | |
|---|---|---|---|
| 3,957,498 A | 5/1976 | Reade | |
| 4,148,661 A | 4/1979 | Kerko et al. | |
| 4,222,781 A | 9/1980 | Morse et al. | |
| 4,251,278 A | 2/1981 | Hares | |
| 4,390,635 A | 6/1983 | Morgan | |
| 5,023,209 A | 6/1991 | Grateau et al. | |
| 5,128,799 A | 7/1992 | Byker | |
| 5,256,601 A | 10/1993 | Kerko et al. | |
| 5,285,077 A | 2/1994 | Hales | |
| 5,481,395 A | 1/1996 | Byker | |
| 5,525,430 A | 6/1996 | Chahroudi | |
| 5,751,467 A | 5/1998 | Byker | |
| 5,790,298 A | 8/1998 | Tonar | |
| 5,801,873 A | 9/1998 | Byker | |
| 6,094,290 A * | 7/2000 | Crawford | E06B 3/6722 359/241 |
| 6,413,643 B1 * | 7/2002 | Kunisada | C03C 17/36 359/360 |
| 7,278,241 B2 | 10/2007 | Wirawan | |
| 7,940,457 B2 * | 5/2011 | Jain | E06B 9/24 349/16 |
| 8,154,788 B2 | 4/2012 | Millett et al. | |
| 8,427,742 B2 * | 4/2013 | Kim | B32B 17/10036 359/359 |
| 8,441,707 B2 * | 5/2013 | Lam | G02B 5/23 359/241 |
| 9,234,382 B2 | 1/2016 | Bouesnard et al. | |
| 2005/0196626 A1 | 9/2005 | Knox et al. | |
| 2006/0023160 A1 | 2/2006 | Cartier et al. | |
| 2006/0090834 A1 | 5/2006 | Huang et al. | |
| 2009/0297806 A1 | 12/2009 | Dawson-Elli et al. | |
| 2011/0133672 A1 | 6/2011 | Tsang et al. | |
| 2011/0206873 A1 | 8/2011 | Showers | |
| 2012/0064265 A1 | 3/2012 | Suh et al. | |
| 2012/0154906 A1 | 6/2012 | Tatapudy | |
| 2013/0286461 A1 | 10/2013 | Broekhuis et al. | |
| 2014/0063582 A1 | 3/2014 | Gross et al. | |
| 2014/0151613 A1 | 6/2014 | Brocheton | |
| 2014/0327949 A1 | 11/2014 | Gross et al. | |
| 2015/0099130 A1 * | 4/2015 | Mauro | C03C 3/089 428/426 |
| 2015/0362646 A1 * | 12/2015 | Lim | G02B 5/23 428/336 |
| 2016/0085131 A1 | 3/2016 | Lam et al. | |

OTHER PUBLICATIONS

International Search Report and Written Opinion PCT/US2016/050746 dated Dec. 12, 2016.

\* cited by examiner

MULTI-PANE WINDOW WITH A LOW EMISSIVITY LAYER AND A PHOTOCHROMIC GLASS

This application claims the benefit of priority under 35 U.S.C. § 119 of U.S. Provisional Application Ser. No. 62/217,123 filed on Sep. 11, 2015, the content of which is relied upon and incorporated herein by reference in its entirety.

BACKGROUND

Field

The present disclosure relates generally to a multi-pane window having a low emissivity layer and photochromic glass.

Technical Background

Conventional architectural windows are comprised of double-pane and triple-pane units. That is, these units have two or three spaced apart glass panes used to insulate the temperature inside a structure from the outdoor temperature. Without effective filtration of electromagnetic radiation transmittance there through, however, conventional windows may lack an element needed to more effectively insulate structures and to control light transmitted into structures.

Accordingly, a need exists for a multi-pane window that is capable of further limiting solar heat gain and adjusting visible light transmissivity.

SUMMARY

The present disclosure provides a multi-pane window comprising an external glass pane spaced apart from an internal glass pane. In embodiments, the external glass pane comprises a low emissivity layer. In embodiments, the internal pane comprises a photochromic glass.

According to one embodiment of the present disclosure, a window comprising an outside glass pane and an inside glass pane is disclosed. In embodiments, the outside glass pane for interaction with outdoors comprises a low emissivity layer. In embodiments, the inside glass pane for interaction with indoors comprises a photochromic glass. In embodiments, the inside glass pane is spaced apart from and disposed substantially parallel to the outside glass pane.

According to yet another embodiment of the present disclosure, a multi-pane window for a building is disclosed. In embodiments, the window comprises an outside glass pane adjacent the building exterior and an inside glass pane adjacent the building interior. In embodiments, the outside glass pane comprises a low emissivity layer. In embodiments, the inside glass pane comprises a photochromic glass. In embodiments, the inside glass pane is spaced apart from and disposed substantially parallel to the outside glass pane by a distance.

According to another embodiment of the present disclosure, a building including a multi-pane window installed between an interior and an exterior of the building is disclosed. In embodiments, the outside glass pane adjacent the building exterior comprises a low emissivity layer. In embodiments, the inside glass pane adjacent the building interior comprises a photochromic glass. In embodiments, the inside glass pane is spaced apart from and disposed substantially parallel to the outside glass pane.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE FIGURES

The disclosure will be better understood, and features, aspects and advantages other than those set forth above will become apparent when consideration is given to the following detailed description thereof. Such detailed description makes reference to the following drawings, wherein.

DETAILED DESCRIPTION

Figure 1:
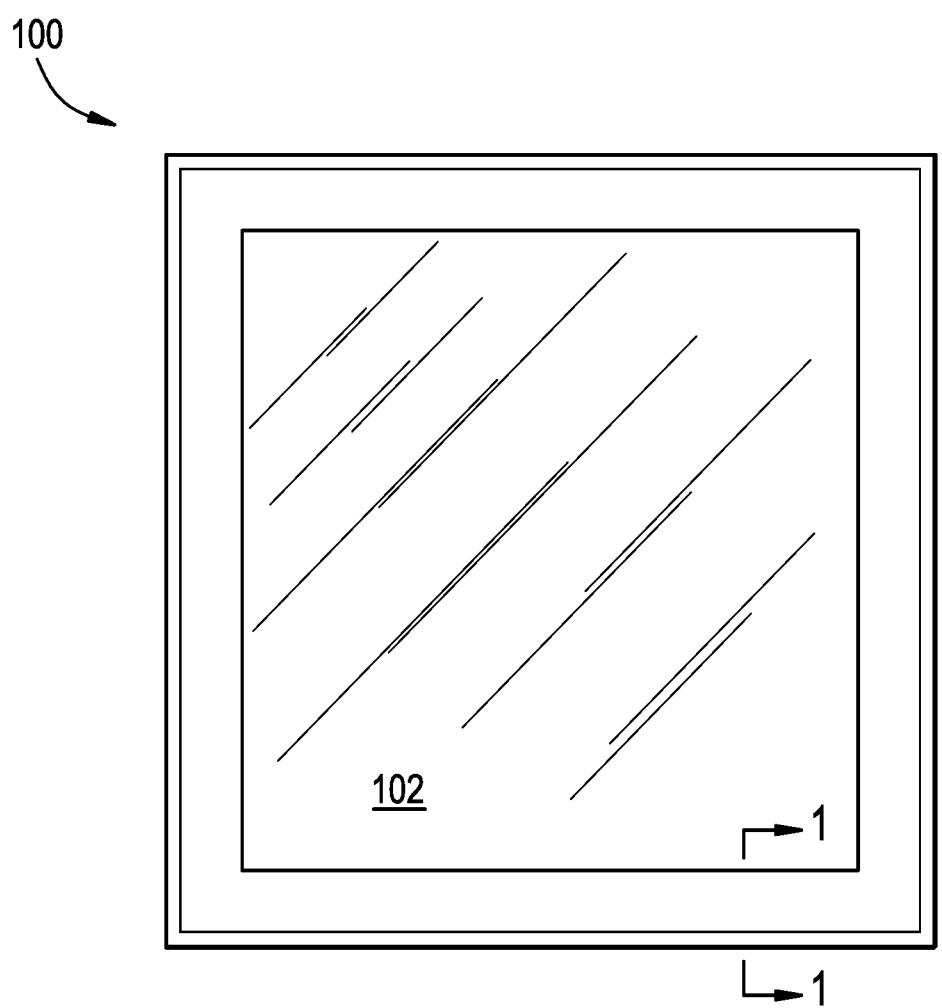
FIG. 1 is a front view of a multi-pane window as seen from the outside of a structure according to some examples.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

Conventional multi-pane windows may have a number of shortcomings. One potential shortcoming may be the transmittance of infrared (IR) and near infrared (NIR) solar light wavelengths into the structure which causes heat gain therein. Another potential shortcoming may be the inability to reduce visible light transmittance over time into the structure independent of the outdoor temperature, but instead dependent upon interaction with specific light wavelengths from outside.

Conventional multi-pane windows have sometimes included low emissivity coatings on their glass panes to limit transmittance of different combinations of solar light wavelengths into the structure. Low emissivity coatings may reflect and/or absorb infrared (IR) and near infrared (NIR) wavelengths from the solar electromagnetic spectrum. In some cases, reflection of IR and NIR wavelengths may be ≥90% of those in the solar spectrum, or even ≥95%. Absorption of IR and NIR wavelengths by low emissivity coatings may be ≤5% of those included in the solar spectrum, or even less ≤1%. Thus, low emissivity coatings may reduce solar heat gain across the window into the structure. Conventional low emissivity coatings may also reflect and/or absorb visible light and ultraviolet (UV) wavelengths. The reflection of visible light by conventional low emissivity coatings may cause distortion of outdoor colors as seen from indoors (e.g., a blue sky viewed through the low emissivity coating may appear grey or green). The fraction of wavelengths absorbed by the low emissivity coating sometimes generates heat on the glass pane which the low emissivity coating exists. Conventional windows including low emissivity coatings are not able to reduce visible light transmittance into the structure over time depending on interaction with specific light wavelengths from outside. Instead, low emissivity coatings transmit a constant fraction of visible light from the solar spectrum.

Conventional multi-pane windows have also sometimes included photochromic organic polymer films on glass panes in windows to reduce transmittance of visible light through the window. These solutions may have limitations in that organic polymer films either degrade or lose their photochromic function before the expiration of the window lifetime. For example, some photochromic organic polymer films degrade after 5 years whereas a multi-pane window sometimes has a useful lifetime of around 30 years. Accordingly, photochromic organic polymer films from conventional multi-pane windows are not in accordance with the present disclosure. That is, photochromic glass of the present disclosure does not include organic polymer films or organic polymer films on glass sheets.

Other conventional windows have sometimes included photochromic glass materials as the outside pane of a window in an attempt to reduce transmittance of visible light through the window depending on solar light intensity. That is, conventional windows have attempted to use photochromic glass properties (i.e., photochromism or darkening) to reduce the fraction of visible light transmittance during times of high solar light intensity (e.g., sunny days, ≥100,000 lux, etc.) and maximize visible light transmittance during times of low solar light intensity (e.g., overcast, night, ≤25,000 lux, etc.). Again, however, conventional windows have included the photochromic glass on the pane exposed to the outside elements. Notably, conventional windows including photochromic glass on the outside pane have failed to effectively change or vary visible light transmittance through the window in response to interaction with specific light wavelengths from solar radiation. After all, the photochromic effect (sometimes called darkening) of photochromic glass is also responsive to temperatures changes. Specifically, higher temperatures (e.g., >26° C.) may lessen a photochromic glass' ability to darken (and thereby reduce visible light transmittance). Also, lower temperatures (e.g., <20° C.) may slow the reversal of the photochromic effect in photochromic glass (i.e., the glass stays in a darkened state for a longer time). Thus, a photochromic glass pane immediately adjacent to and exposed to outside temperatures may have problems.

Figure 8:
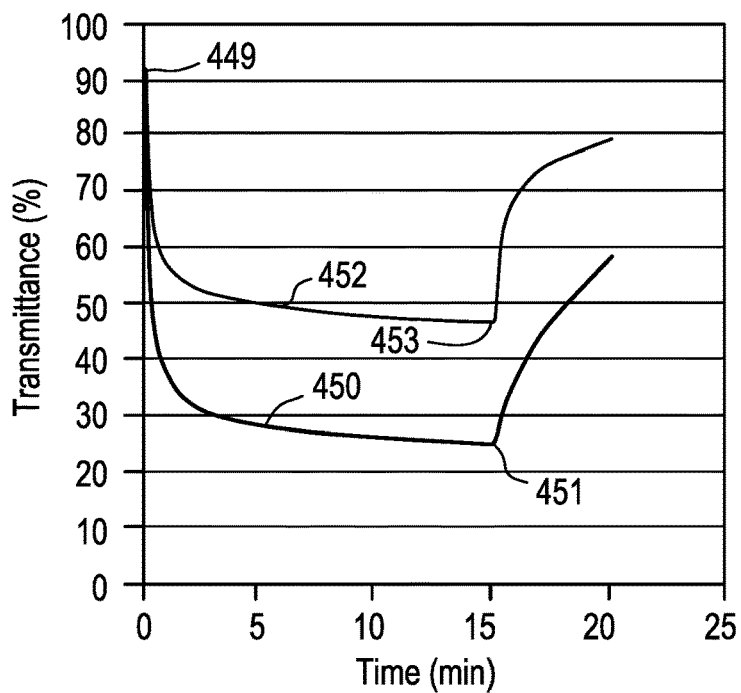
FIG. 8 is a plot of light transmittance (%) vs. time (minutes) for a 2 mm thick Photogray® Extra photochromic glass pane at two different test temperatures.
Figure 9:
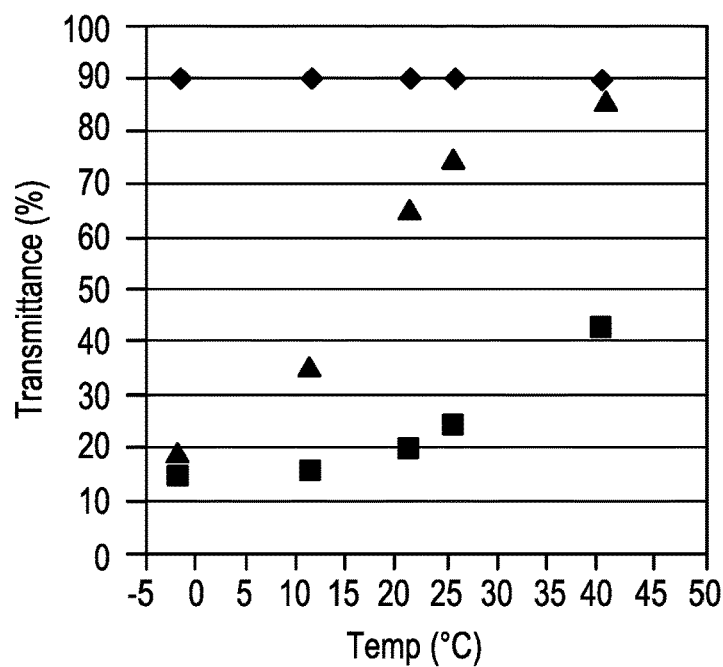
FIG. 9 is a plot of light transmittance (%) vs. temperature (° C.) for five tests of a 2 mm thick Photogray® Extra photochromic glass pane at five different temperatures.

FIGS. 8 & 9 illustrate some possible problems associated with conventional multi-pane windows including photochromic glass windows as the outside pane. Both figures show that the change in visible light transmittance through photochromic glass exposed to solar light may be dependent, in part, on the temperature of the photochromic glass. Both also illustrate that the reversal rate of the photochromic effect when removed from solar light may depend on the temperature of the photochromic glass.

FIG. 8 provides a plot of light transmittance (%) vs. time (minutes) for a 2 mm thick Photogray® Extra glass pane in a solar simulator at two different temperatures. In both tests, the same Photogray® Extra glass pane has an original visible light transmissivity of about 90%. A simulated solar light was turned on at time t0 (indicated by point 449) in both tests. In the first test, indicated by line 450, the glass pane is kept at about 20° C. After 15 minutes (indicated by point 451), the photochromic effect (darkening) of the glass reduced the fraction of visible light transmissivity through the glass to about 28%. At point 451, the simulated solar light was turned OFF (deactivating the photochromism of the glass) which increased visible light transmissivity through the photochromic glass to about 59% after 5 minutes. In the second test, indicated by line 452, the glass pane is kept at 40° C. After 15 minutes (indicated by point 453), the darkening of the glass had reduced the fraction of visible light transmissivity through the glass to about 48%. At point 453, the light was turned OFF which increased visible light transmissivity through the photochromic glass to about 80% after 5 minutes. This illustrates one of the problems conventional windows may have when including the photochromic glass pane as the outside pane. For example, on hot days, when the sunlight is often at its most intense (e.g., ≥50,000 lux), the photochromic glass may be less effective (does not darken as much) at shielding the building inside from outside visible light or glare.

Similarly, FIG. 9 provides a plot of light transmittance (%) vs. temperature (° C.) for a 2mm thick Photogray® Extra photochromic glass pane tested at five different temperatures. Each test temperature includes three data points (one diamond, one square, and one triangle) with the temperature of the glass pane remaining constant during each test. In each test, the same Photogray® Extra photochromic glass pane started with a visible light transmissivity of about 90% (represented by the diamond data points). In each of the five tests, the pane was exposed to simulated solar light for 15 minutes and the visible light transmissivity was measured (represented by the square data points). The solar light simulator was turned OFF to deactivate the photochromism and the visible light transmissivity was measured again after 5 minutes (represented by the triangle data points). FIG. 9 illustrates a trend that as the temperature of a photochromic glass pane increases (e.g., >26° C.), its photochromic capability may decrease. That is, a hotter photochromic glass pane may not darken as much so as to reduce the fraction of visible light transmissivity. Coincidently, hot, sunny days are a typical time when the darkening of photochromic glass would be most useful. FIG. 9 also illustrates that as the temperature of a photochromic glass pane decreases (e.g., <20° C.), it may quickly darken in response to solar light but its capability to reverse from a darkened state may slow. That is, a colder photochromic glass pane may darken to limit transmissivity of visible light quickly, but may remain in that state for a longer time period. Also problematic, cold, overcast days (with periodic sun exposure) are a typical time when the quick reversal of darkening of photochromic glass would be most useful. Thus, these examples illustrate that conventional window configurations including photochromic glass may not successfully control and vary visible light transmittance from solar radiation into the structure.

The present disclosure is directed to a multi-pane window 100 with a low emissivity layer and a photochromic glass. Window 100 may be an architectural window, for example. Accordingly, window 100 may be integral with an opening between the exterior and interior of an enclosure or building. In embodiments, window 100 may be movable with respect to an opening in a building. Further, window 100 may be part of a door that is fixed or movable with respect to an opening in an enclosure or building FIG. 1 provides an example of window 100. Of course, various dimensions and shapes of window 100 are possible and in accordance with the present disclosure. Window 100 shown in FIG. 1 may be a double pane or a triple pane window. Of course, window 100 may include any number of glass panes greater than one pane. Window 100 may further include a spacer 421 between its panes. Spacer 421 may be an edge seal formed around respective edges of its glass panes, a metallic pillar between the surfaces of its glass panes, a low thermal conduction material, and/or a glass bump attached to or formed integrally with one or both glass panes. Spacer 421 may assist in creating a space between its glass panes. Window 100 may further include a frame 420 around the edges of its glass panes.

In embodiments, frame 420 is configured to mate or communicate with an opening in a building or enclosure such that window 100 installed with inside glass pane 202 adjacent the building interior and outside glass pane 102 adjacent the building exterior. In embodiments, frame 420 includes an overhanging portion configured to interfere with an edge of an opening in a building or enclosure and to prevent window 100 from being installed in the opening such that outside glass pane 102 is adjacent the building interior. Window 100 may also include a locking mechanism adjacent inside glass pane 202 and internal to the building or enclosure. In embodiments, the locking mechanism is configured to be accessible only from the building interior by a user so as to limit access through window 100. In embodiments, the locking mechanism is fixed directly or indirectly to frame 420 and communicates with a portion opening in the building or enclosure.

Figure 2:
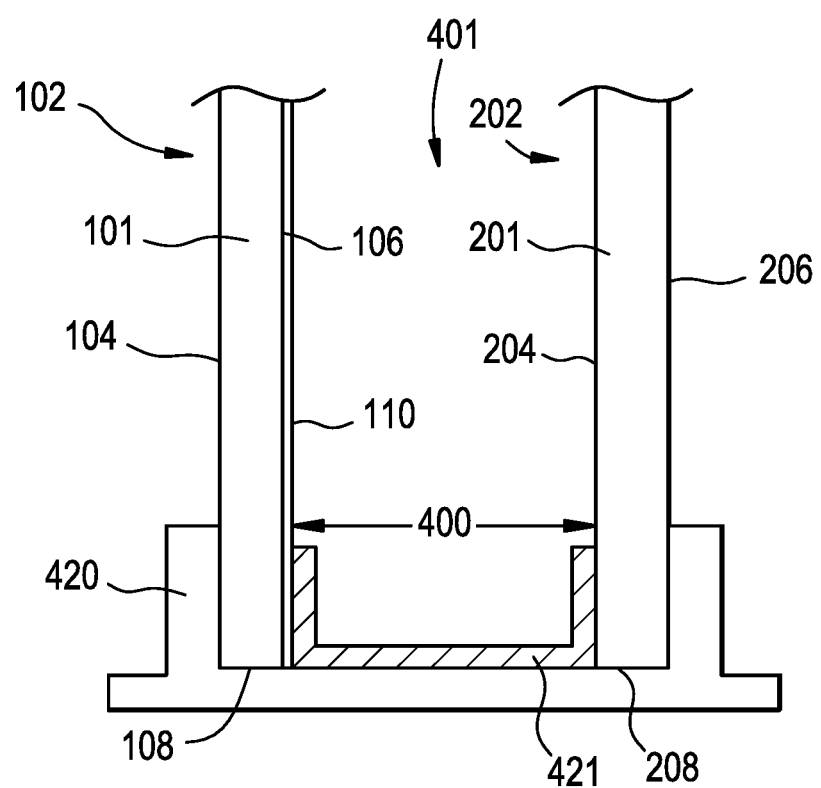
FIGS. 2-5 are cross-sectional views of the peripheral edge of a double-pane window, drawn along line 1-1 of FIG. 1, according to some examples.

Referring to an example of a double pane embodiment of window 100 shown in FIG. 2 (a cross-section of a peripheral edge of window 100 in FIG. 1), window 100 includes an outside glass pane 102 and an inside glass pane 202 with a space 401 there between. Outside glass pane 102 and inside glass pane 202 are spaced apart from and disposed substantially parallel each other. Space 401 is defined in part by a distance 400 between pane 102 and 202. Distance 400 may be from about 50 microns to about 50 mm, or from about 5 mm to about 25 mm. Space 401 may be sealed and include an insulating gas such as air, argon, krypton, xenon, and combinations thereof. Alternatively, space 401 may be sealed and include a pressure less than atmospheric pressure, including a vacuum pressure.

Exemplary glass panes (photochromic glass, non-photochromic glass, or otherwise) can have any suitable dimensions. Panes can have physical (length and width) dimensions that independently range from about 0.1 m to about 10 m (e.g., 2, 5, 10 m) and a thickness dimension that can range from about about 0.1 mm to about 10 mm (e.g., 0.5, 1, 2, 5, 7 mm). Lateral dimensions and thicknesses of glass panes 102, 202, 302 in window 100 provide a rigid structure.

Outside glass pane 102 is for interaction with outdoors. In embodiments, outside glass pane 102 is configured to be on the outside of an enclosure or adjacent a building exterior and exposed to weather, ambient conditions, and/or direct sunlight. Outside glass pane 102 may also be referred to as external glass pane 102 and/or exterior glass pane 102 herein. Inside glass pane 202 is for interaction with the indoors. In embodiments, inside glass pane 202 is configured to be on the inside of an enclosure or building and exposed to conditions therein, including climate controlled conditions such as heating and/or air conditioning. Inside glass pane 202 may also be referred to as internal glass pane 202 and/or interior glass pane 202 herein.

In embodiments, outside glass pane 102 includes a body 101 with an outside surface 104 opposite an inside surface 106. In embodiments, outside surface 104 is directly exposed to the outdoors or building exterior. In embodiments, inside surface 106 is adjacent space 401 between panes 102, 202. In embodiments, outside glass pane includes at least one outer edge 108. In embodiments, outside glass pane 102 includes additional surfaces and/or edges. In embodiments, outside glass pane 102 is formed from a glass material and includes a low emissivity layer 110. Low emissivity layer 110 may be on surface 104, on surface 106, and/or at any location between surfaces 104 and 106. In an embodiment, shown in FIG. 2, low emissivity layer 110 is on surface 106 such that low emissivity layer 110 is shielded from weather and other outdoor elements. Yet in alternative embodiments, outside glass pane 102 may be entirely comprised of a low emissivity composition. In embodiments, outside glass pane 102 includes a substantially transparent, non-photochromic glass. In embodiments, non-photochromic glasses include soda-lime glass, aluminosilicate glass, borosilicate glass, and/or combinations thereof. Visible light absorption and/or reflection by the glass material of outside glass pane 102 may be negligible. The glass material of outside glass pane 102 is not photochromic glass. That is, outside glass pane 102 may include any non-photochromic glass. Photochromic glass on outside pane 102 would be susceptible to the shortcomings of conventional windows including photochromic glass described above. Specifically, the photochromism of the photochromic glass may be partly dependent upon the temperature of the glass via heat transfer from outside ambient conditions. Thus, the various embodiments of the present disclosure may thermally isolate the photochromic glass from temperatures above or below room temperature, and yet still allow transmittance of specific wavelengths of light thereto to activate its photochromic properties.

Low emissivity layer 110 may be a film, a coating, or a layer on or within the glass material of outside glass pane 102. Low emissivity layers of the present disclosure are not photochromic organic polymer films. Low emissivity layer 110 may be applied to or within outside glass pane 102 via magnetron sputtering vapor deposition (MSVD), pyrolysis, spraying, sputtering, and other similar processes.

Low emissivity layer 110 reflects and/or absorbs light from outdoors impinging on outside glass pane 102. In an example embodiment, low emissivity layer 110 of outside glass pane 102 reflects and/or absorbs any near infrared (NIR) and/or infrared (IR) light from solar radiation (from outdoors). For example, low emissivity layer 110 selectively reflects and/or absorbs light having a wavelength from about 700 nm to about 1 mm, or from about 701 nm to about 40,000 nm, or from about 701 to about 2,000 nm. Selective reflection may include reflection of ≥80%, or even ≥95%, of NIR and IR wavelengths interacting with low emissivity layer from outside solar radiation. With low emissivity layer 110, outside glass pane 102 may transmit ≤20%, or even ≤5% of NIR and/or IR light contacting outside glass pane 102. Percent transmittance by outside glass pane 102 including layer 110 may be calculated using the ISO 9050: 2003 Standard ("Glass in building—Determination of light transmittance, solar direct transmittance, total solar energy transmittance, ultraviolet transmittance, and related glazing factors), for example. Alternatively, percent transmittance may be calculated by other standards and codes adopted by the International Code Council (ICC). Outside glass pane 102 with low emissivity layer 110 may have solar heat gain of ≤60%, or even ≤40% as a result of solar light contacting pane 102.

In an embodiment, low emissivity layer 110 transmits light in the visible spectrum. In embodiments, low emissivity layer 110 transmits a least a portion of all wavelengths in the visible spectrum so objects on the building exterior do not appear in distorted coloring. In embodiments, layer 110 transmits light having a wavelength from about 350 nm to about 700 nm, or transmits light having wavelength from about 390 nm to about 700 nm, or transmits light having wavelength from about 350 nm to about 420 nm. Light transmitted by low emissivity layer 110 within the above disclosed ranges may activate the photochromism of photochromic glass in window 100. Activation of the photochromism of photochromic glass materials according to the present disclosure may cause darkening of the glass, or a reduction in the fraction of visible light transmittance there through by about 40% or more, about 50% or more, or about 60% or more, or about 70% or more, or about 80% or more, up to 99%. In embodiments, low emissivity layer 110 of outside glass pane 102 may reflect and/or absorb UV light wavelengths from about 100 nm to about 310 nm impinging thereon from outdoors.

Absorption and/or reflection of IR and NIR wavelengths from the outdoors by the low emissivity layer minimizes heat transfer into space 401, onto inside glass pane 202, and/or across window 100 into the enclosure or building. This absorption and/or reflection of IR and NIR wavelengths by low emissivity layer 110 may also reduce heat gain and transfer of heat to photochromic glass materials. In an exemplary embodiment, low emissivity layer 110 may be configured to selectively transmit specific wavelengths through pane 102 for interaction with photochromic glass on panes 202, 302. In an example embodiment, the specific wavelengths may be from about 350 nm to about 700 nm, or from about 390 nm to about 700 nm, or even from about 390 nm to about 420 nm. Interaction of these specific light wavelengths with the photochromic glass may activate and darken the photochromic glass. Darkened photochromic glass may have an about 50% or more decrease in the visible light transmittance there through. Despite its reflective and absorptive properties, low emissivity layer 110 of pane 102 may transmit some non-visible wavelengths of electromagnetic radiation impinging thereon. In an exemplary embodiment, low emissivity layer 110 of pane 102 transmits ≥50% of visible light wavelengths from outside solar radiation, or ≥60%, or ≥70%, or even ≥95%.

Low emissivity layer 110 may have an average thickness from about 1 nm to about 500 nm on the surface of a pane of window 100. Low emissivity layer 110 may be comprised of several layers to create a total thickness. The layers may be disposed adjacent one another. In alternative embodiments, low emissivity layer 110 may be comprised of several layers spaced apart that cumulatively form the total thickness. In exemplary embodiments, low emissivity layer has a thickness from about 50 nm to about 250 nm, or even from about 100 nm to about 150 nm.

In window 100, panes including a low emissivity layer according to embodiments may be SUNGATE® or SOLAR-BAN® low emissivity glass family products by PPG Industries; SUNGARD® low emissivity glass family products from Guardian; SOLAR-E® low emissivity glass family products from Pilkington-NSG; or PLANIBEL™ or COMFORT-AC™ low emissivity glass family products from Asahi Glass Company. In embodiments, low emissivity layer 110 comprises metallic silver, metallic nickel, silicon nitride, zirconium oxide, tin oxide, zinc oxide, and/or combinations thereof. Tin oxides include, but are not limited to, indium tin oxide and fluorine doped tin oxide. Low emissivity layer 110 of the present disclosure may be selected based on the photochromic properties of the photochromic glass such that the photochromic glass is activated (darkened) by specific light wavelengths transmitted by the low emissivity layer. That is, as one of ordinary skill would understand, layer 110 may be configured or selected such that specific light wavelengths are transmitted there through which activate the photochromic glass of window 100.

In embodiments, such as FIG. 2, inside glass pane 202 includes a body 201 with an outside surface 204 opposite an inside 206. In embodiments, surface 206 is directly exposed to the indoors or is adjacent a building interior. In embodiments, surface 204 is adjacent space 401 between panes 102, 202. In embodiments, inside glass pane 202 also includes at least a first outer edge 208. In embodiments, inside glass pane 202 may include additional surfaces and/or edges. In embodiments, inside glass pane 202 may be formed in whole or in part from a photochromic glass material. That is inside glass pane 202 may be a photochromic glass pane or a glass laminate including a photochromic glass material. With inside glass pane 202 comprising the photochromic glass, the photochromic glass may be insulated from hot (e.g., ≥35° C.) and cold (e.g., ≤15° C.) outdoor temperatures that undesirably impact the photochromic effect as described above. In embodiments of the present disclosure, photochromic glass of glass pane 202 may be insulated from the outside ambient temperatures by external glass pane 102, low emissivity layer 110, and/or space 401. In an exemplary embodiment, the photochromic glass of inside glass pane 202 is exposed to room temperature (e.g., about 20° C. to about 26° C.) conditions inside the structure.

In embodiments, photochromic glass of the present disclosure is an amorphous solid inorganic material. In embodiments, photochromic glass of the present disclosure may be substantially transparent when exposed only to visible light wavelengths. Photochromic glass of the present disclosure is configured to reversibly darken when exposed to activation wavelengths of solar light. Photochromic glass compositions of the present disclosure may comprise, in terms of weight percent (wt. %): $SiO_2$ 54-66; $Al_2O_3$ 7-15; $B_2O_3$ 10-25; $Li_2O$ 0.5-4; $Na_2O$ 1-15; $K_2O$ 0-12; $ZrO_2$ 0-6; $TiO_2$ 0-3; PbO 0-1; Ag 0.1-1; Cl 0.1-1; Br 0-3; CuO 0.006-0.02; $Sb_2O_3$ 0-0.2; $SnO_2$ 0-0.2; $CeO_2$ 0-2.5; and F 0-2.5. In another embodiment, the photochromic glass may include, in terms of weight percent: $SiO_2$ 55-57; $Al_2O_3$ 6-7; $B_2O_3$ 18-19; $Li_2O$ 1-2; $Na_2O$ 1-5; $K_2O$ 5-6; $ZrO_2$ 4-6; $TiO_2$ 2-3; Ag 0-0.5; CuO 0-1; Cl 0-1; and Br 0-1. In yet another embodiment, the photochromic glass may include, in terms of weight percent: $SiO_2$ 54-57; $Al_2O_3$ 6-8; $B_2O_3$ 19-21; $Li_2O$ 3-5; $Na_2O$ 0-2; $K_2O$ 5-7; $ZrO_2$ 3-5; $TiO_2$ 0-2; PbO 0-1; Ag 0-1; Cl 0-1; Br 0-1; CuO 0-1; and $Sb_2O_3$ 0-1. In yet another embodiment, the photochromic glass may include, in terms of weight percent: $SiO_2$ 58-61; $Al_2O_3$ 8-11; $B_2O_3$ 18-21; $Li_2O$ 1-3; $Na_2O$ 0-4; $K_2O$ 5-7; PbO 0-1; AgO 0-1; Cl 0-1; Br 0-1; and CuO 0-1. In yet another embodiment, the photochromic glass may include, in terms of weight percent: $SiO_2$ 51-66; $B_2O_3$ 15-23; $Al_2O_3$ 3-10; $ZrO_2$ 2.5-11; $TiO_2$ 0-1; $Li_2O$ 3-7; $Na_2O$ 0-8; $K_2O$ 2-9; Ag 0.080-0.30; CuO 0.002-0.013; Cl 0.1-0.6; Br 0.040-0.3; MgO 0-3; CaO 0-3; SrO 0-3; BaO 0-3; $Nb_2O_5$ 0-1; $La_2O_3$ 0-8; and $Y_2O_3$ 0-8.

Figure 11:
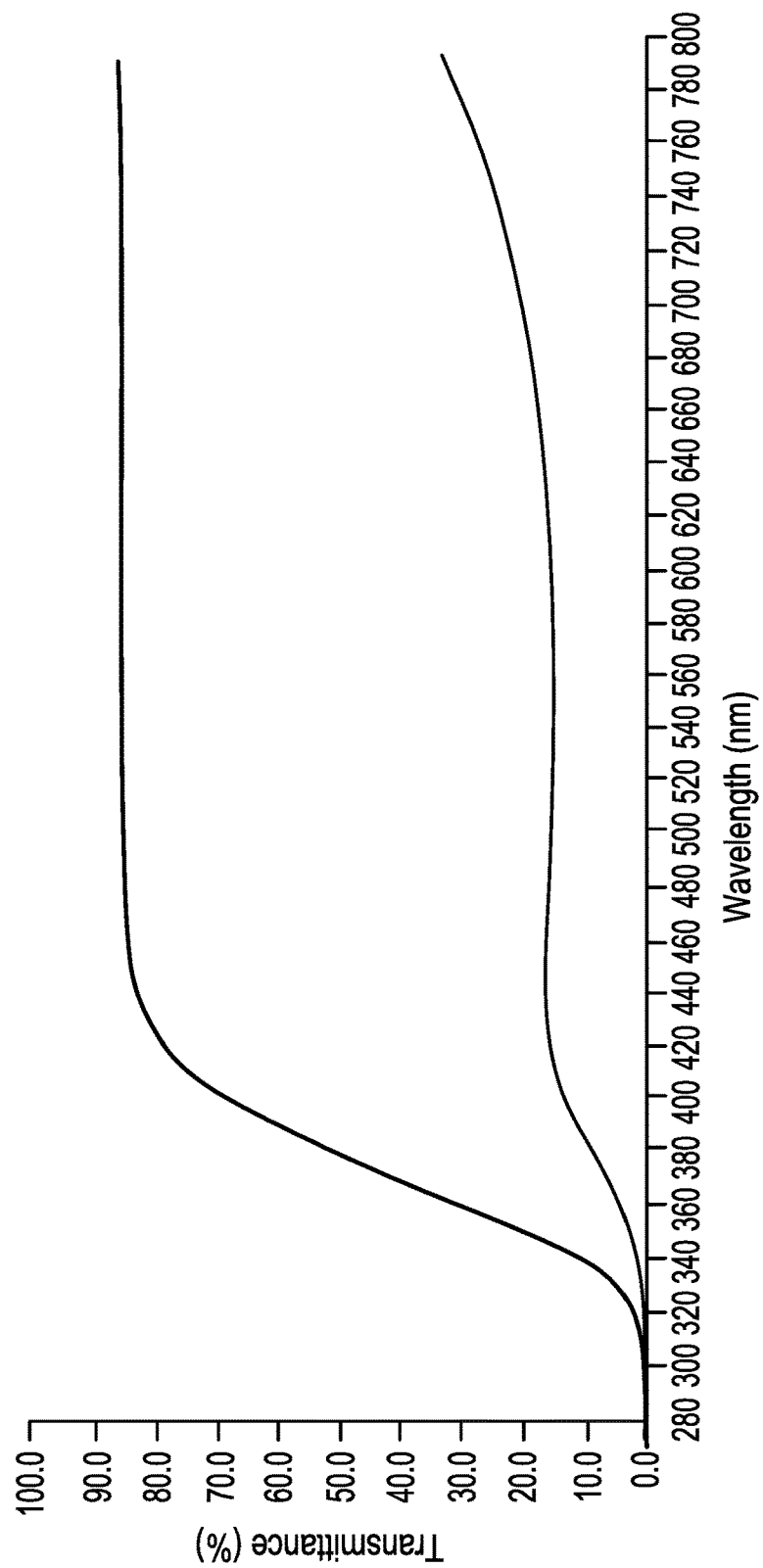
FIG. 11 is a plot of light transmittance (%) vs. wavelength (nm) for a 1.5 mm thick Photogray® Thin & Dark photochromic glass pane.
Figure 12:
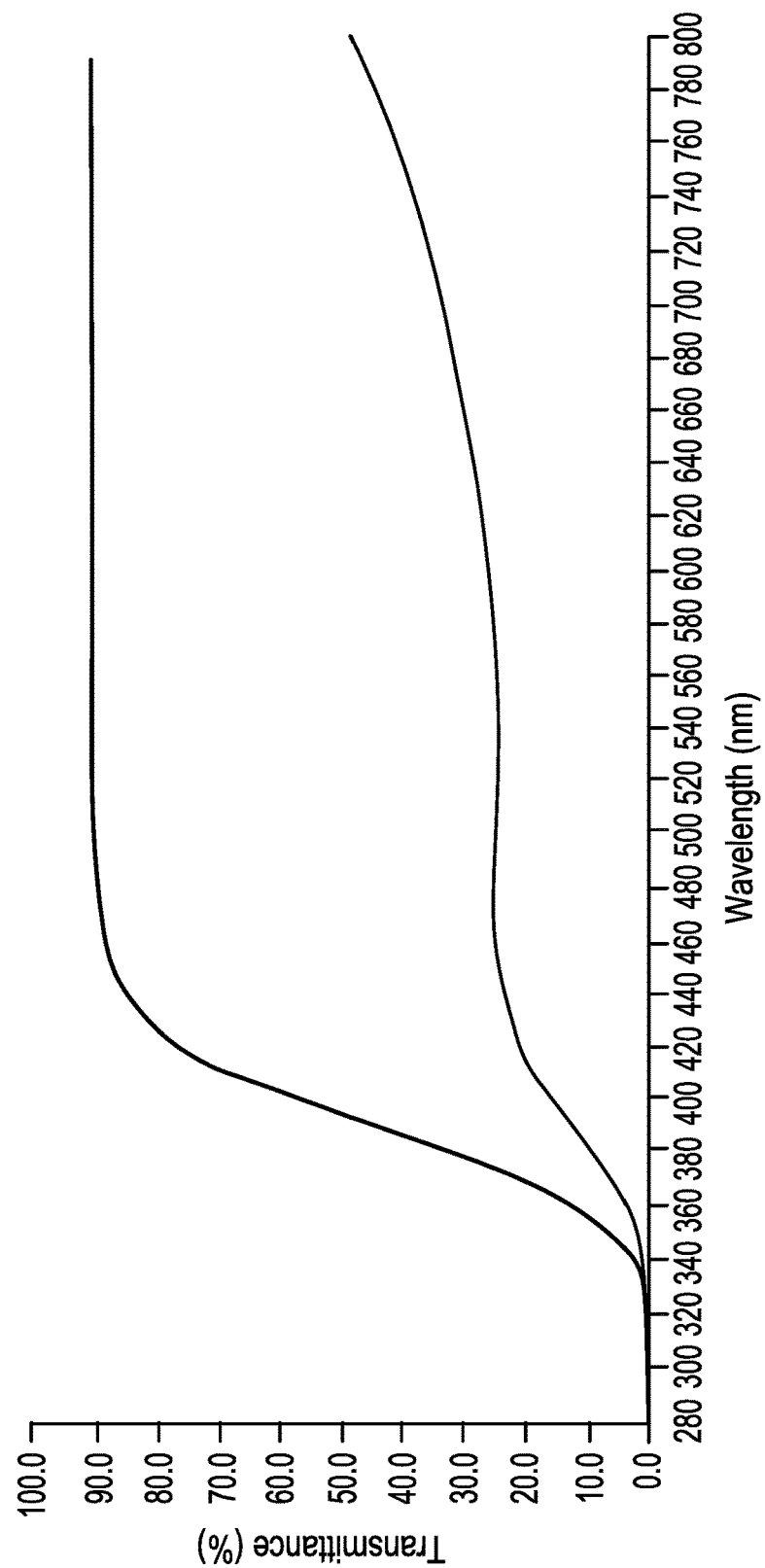
FIG. 12 is a plot of light transmittance (%) vs. wavelength (nm) for a 2 mm thick Photogray® Extra photochromic glass pane.

In alternative embodiments, the photochromic glass is Photogray® Extra, Photogray® Thin & Dark, or Photobrown® Extra by Corning Incorporated. FIG. 11 provides the percent transmittance for Photogray® Thin & Dark (1.5 mm thickness at 22° C.) as a function of wavelength (nm) exposure at a faded state (top line) and at a darkened state (bottom line). FIG. 12 provides the percent transmittance for Photogray® Extra (2 mm thickness at 22° C.) as a function of wavelength (nm) exposure at a faded state (top line) and at a darkened state (bottom line). The thickness of photochromic glass (e.g., the photochromic portion of a laminated glass pane) of the present disclosure may be from about 1 mm to about 6 mm, or from about 2 mm to about 4 mm, or from about 1 mm to about 1.5 mm. In alternative embodiments, the photochromic thickness in a glass pane of window 100 may be a single thickness or a combination of thicknesses in one or more photochromic glass panes laminated directly or indirectly together. Photochromic glass of the present disclosure may be selected based on the properties of the low emissivity layer such that the photochromic glass is activated (darkened) by specific light wavelength transmitted by the low emissivity layer. Photochromic glasses of the present disclosure are not photochromic organic polymers.

Photochromic glass of the present disclosure may be activated by solar light transmitted through outside glass pane 102 including layer 110. Photochromic glass of the present disclosure is passive (reactive to contact with solar output wavelengths) and does not require electricity for activation of the photochromic effect. That is, photochromic glass is characterized in that its optical transmittance decreases when exposed to actinic radiation but which returns to its original transmittance state upon elimination of this radiation. Photochromic glass of the present disclosure may be activated by visible solar light wavelengths transmitted through layer 110 on a glass pane. In embodiments, photochromic glass of the present disclosure is activated by light transmitted by layer 110 which may be any visible wavelength, may have any wavelength from about 350 nm to about 700 nm, or from about 390 nm to about 700 nm, or even from about 350 nm to about 420 nm. In embodiments, photochromic glass of the present disclosure is activated by actinic wavelengths transmitted by outside glass pane 102 including layer 110. In an exemplary embodiment, photochromic glass exposed to solar light transmitted by layer 110 darkens to a level to reduce visible light transmittance there through by at least about 40%, or by about 50%, or by about 60%, or even by about 75%. In another exemplary embodiment, specific light wavelengths (e.g., from about 350 nm to about 700 nm) transmitted by layer 110 interacts with photochromic glass and darkens it to a level to reduce light transmittance there through by at least about 50%, or by about 60%, or even by about 75%. When darkened, photochromic glass of the present disclosure may transmit ≥10% of visible light that contacts outside glass pane 102. In another embodiment, darkened photochromic glass may transmit ≤50%, or even ≤35%, of visible light that contacts outside glass pane 102. Percent transmittance by the photochromic glass may be calculated using the ISO 9050: 2003 Standard, for example. Alternatively, percent transmittance may be calculated by other standards and codes adopted by the International Code Council (ICC).

Figure 3:
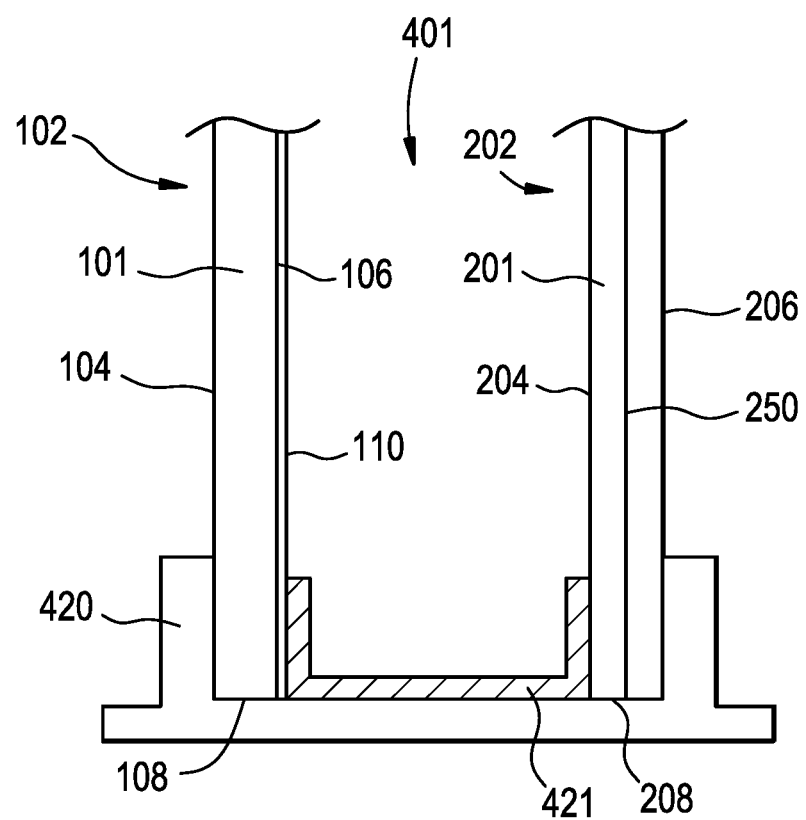

FIG. 3 illustrates an example embodiment of window 100 where pane 202 is a laminate of a non-photochromic glass and a photochromic glass with an interface 250 there between. In embodiments, one surface of inside glass pane 202 is formed from non-photochromic glass and the opposite surface is formed from photochromic glass. In embodiments, interface 250 is between the laminate components. Interface 250 is the area of transition within inside glass pane 202 from the non-photochromic glass material to the photochromic glass material. Interface 250 may include conventionally known laminate bonding materials. Non-photochromic glass materials of the present disclosure may be soda-lime glass, aluminosilicate glass, borosilicate glass, and/or combinations thereof. In embodiments, the laminate structure of pane 202 may provide strength to a thinner (e.g., ≤3mm) photochromic glass sheet.

Figure 4:
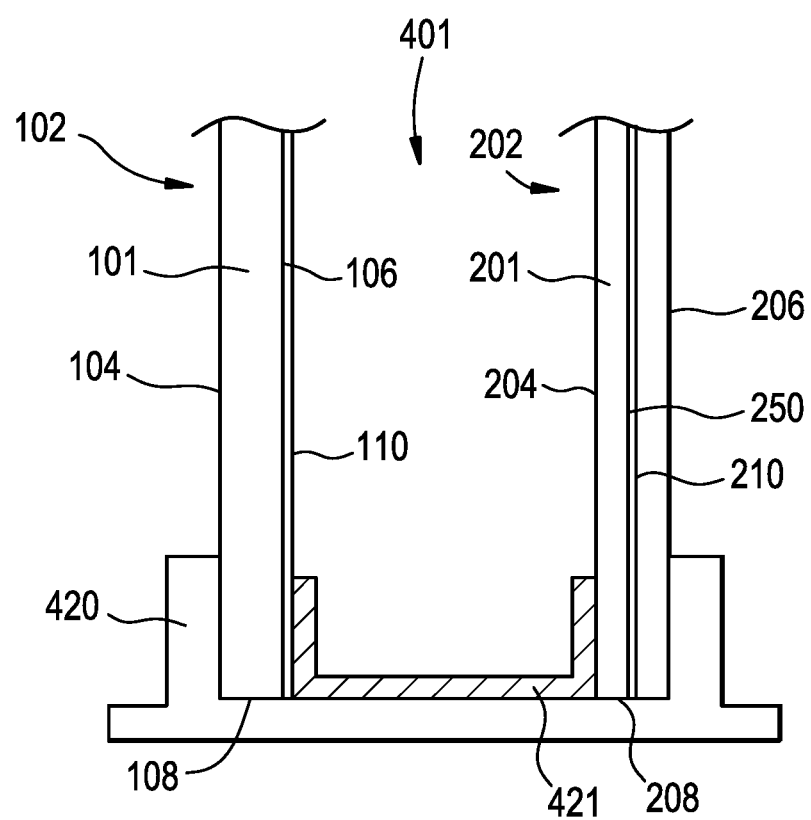

FIG. 4 illustrates another embodiment of window 100 where a low emissivity layer 210 is provided at interface 250, between the non-photochromic glass and photochromic glass laminate in pane 202. In another embodiment, low emissivity layer 210 could be provided in any area across the thickness of glass pane 202, including on surface 206. Low emissivity layer 210 at interface 250 may further assist as an insulting layer within pane 202 (for the photochromic glass from both inside and outside temperatures) as described above. In embodiments, one or both of surfaces 204, 206 of glass pane 202 may be formed from photochromic glass. One of surfaces 204, 206 may also be formed from non-photochromic glass, as described above, such as a soda-lime glass composition. Low emissivity layer 210 at interface 250 on glass pane 202 may be the same as or different from than low emissivity layer 110 on glass pane 102.

In an exemplary embodiment where surface 204 of pane 202 is formed from photochromic glass and surface 206 of pane 202 is formed from a non-photochromic (with interface 250 there between), low emissivity layer 210 provided at interface 250 could be different than that low emissivity layer 110. Specifically, layer 210 may be a UV blocking layer capable of selectively reflecting and/or absorbing UV wavelengths from inside the structure that may activate the photochromism (darkening) of photochromic glass formed as surface 204 of pane 202. The desire to filter UV light from inside the structure is illustrated in FIG. 10.

Figure 7:
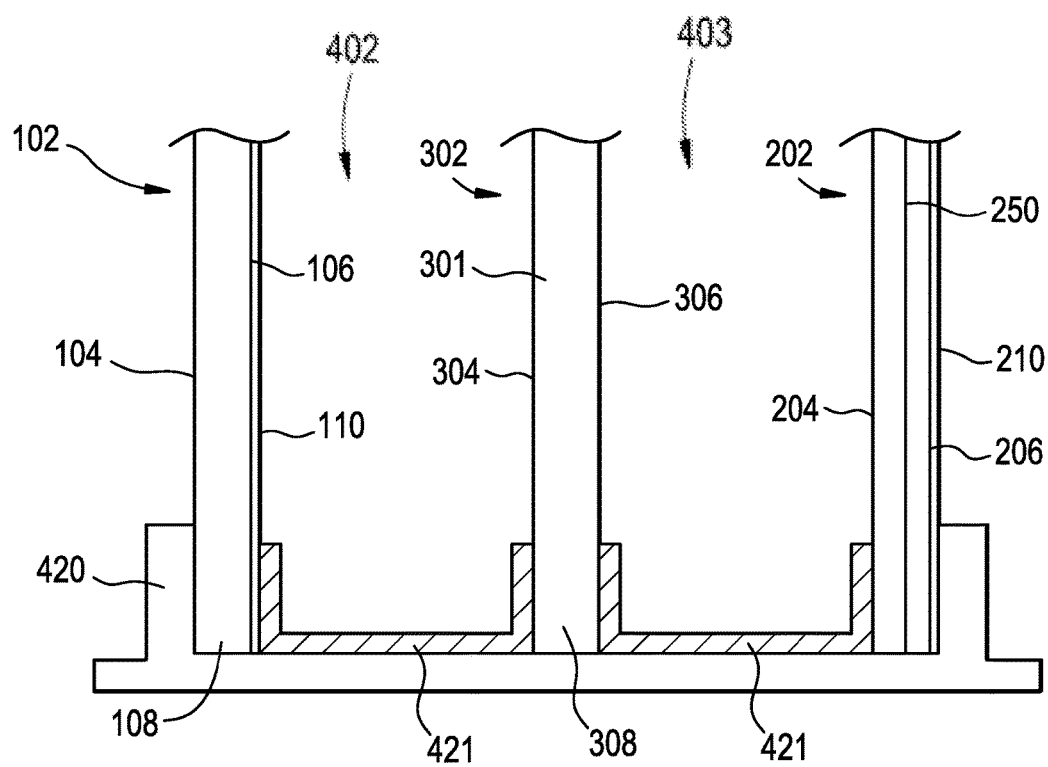
Figure 10:
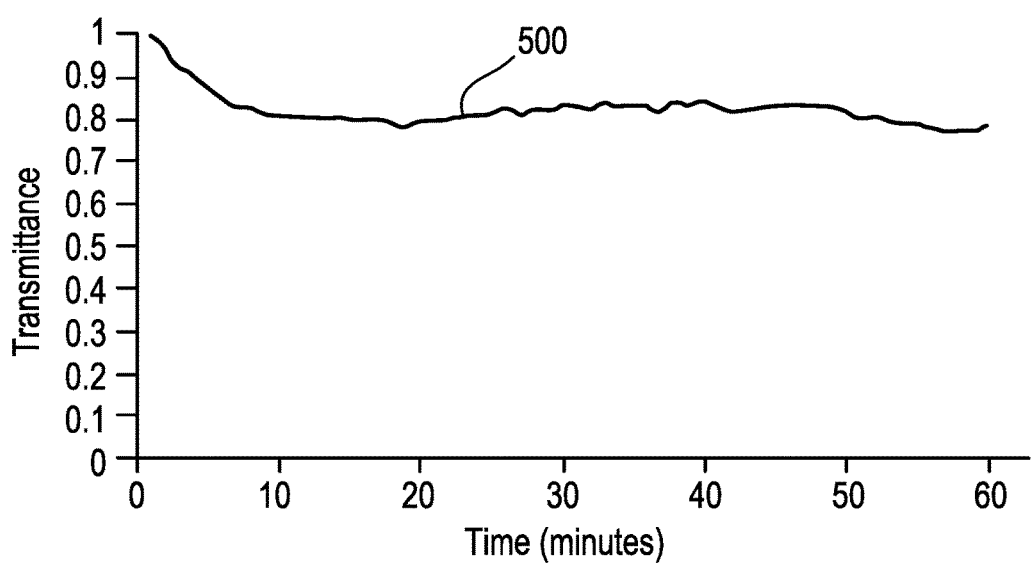
FIG. 10 is a plot of visible light transmittance (fraction) v. time (minutes) for 2 mm thick Photogray® Extra photochromic glass pane exposed to light internal to a structure.

FIG. 10 provides a transmittance test of a Photogray® Extra photochromic glass pane exposed to internal building light—not external, outdoor light. The transmittance plot (illustrated by line 500) shows that the photochromic pane reduces visible light transmittance there through by about 20% after about 5 minutes of exposure to internal light. That is, internal light reduces visible light transmittance through photochromic glass from total visible light transmittance (i.e., 1) to about 0.8 visible light transmittance. When installed in a building, background photochromic fading may be caused by UV light originating from inside light. Thus, a layer capable of minimizing transmittance of UV wavelengths to the photochromic glass in pane 202 (as shown in FIG. 3, FIG. 4, and FIG. 7) could assist the photochromic glass not to react photochromically (darken) in response to inside light. Instead, photochromic glass formed as surface 204 would only react to transmitted outside ambient light. A low emissivity layer 210 on surface 206 could be formed at interface 250 (as shown in FIG. 4) or on surface 206.

Figure 6:
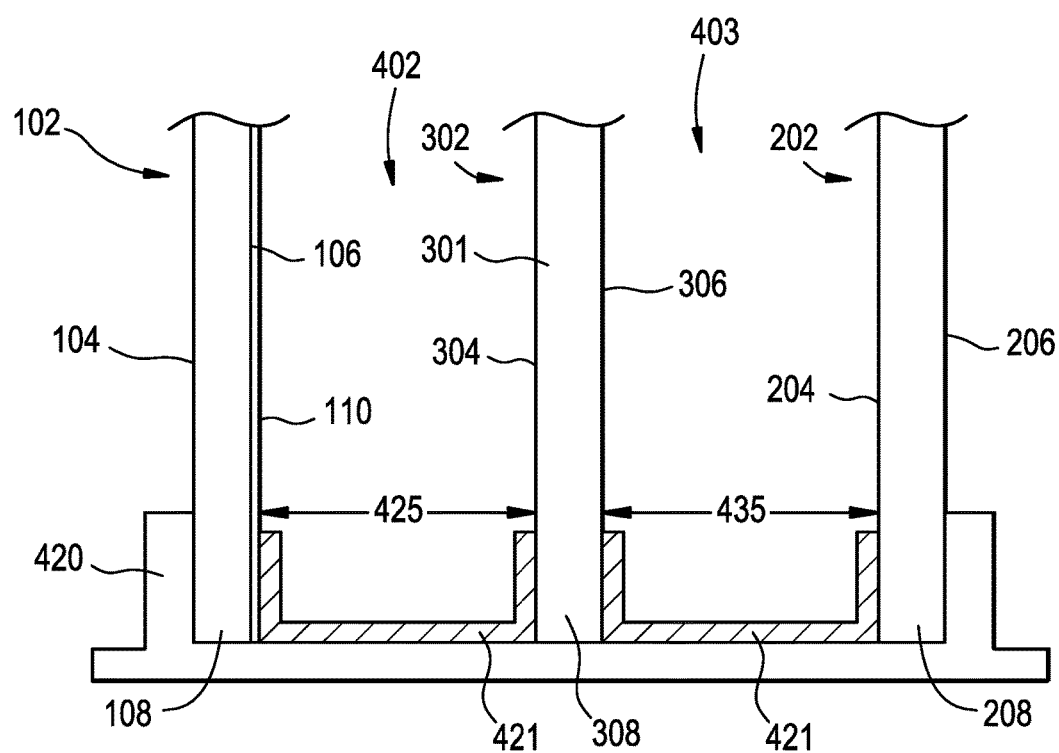
FIGS. 6-7 are cross-sectional views of the peripheral edge of a triple-pane window, drawn along line 1-1 of FIG. 1, according to some examples.

In the FIG. 6 embodiment, a third glass pane 302 may be within space 401 between glass panes 102 and 202. In embodiments, glass pane 302 includes a body 301 with an outside surface 304 opposite an inside surface 306. In embodiments, glass pane 302 may be in space 401 between panes 102, 202. In embodiments, a space 402 may exist between panes 102, 302 and a space 403 may exist between panes 302, 202. In embodiments, glass pane 302 is spaced apart from and disposed substantially parallel to glass panes 102, 202. Space 402 may be defined in part by a distance 425 between pane 102 and 302. Space 403 may be defined in part by a distance 435 between pane 302 and 202. Spaces 402, 403 may include spacer 421. Distances 425, 435 may be the same or different than distance 400. One or both of spaces 402, 403 may be sealed and include an insulating gas like air, argon, krypton, and xenon. Alternatively, one or both of spaces 402, 403 may be sealed and include a pressure less than atmospheric pressure (e.g., vacuum). In embodiments, outside surface 304 of pane 302 is adjacent space 402 between panes 102, 302. In embodiments, inside surface 306 is adjacent space 403 between panes 302, 202. In embodiments, glass pane 302 also includes at least one outer edge 308. Glass pane 302 may include additional surfaces and/or edges. Glass pane 302 may be formed from non-photochromic glass including soda-lime glass, aluminosilicate glass, borosilicate glass, and/or combinations thereof.

Glass pane 302 may also include a low emissivity layer (not shown in FIGS. 6 and 7). Low emissivity layer 310 may be on surface 304, on surface 306, and/or at a location there between. Low emissivity layer 310 may be the same as or different from low emissivity layers 110, 210. Glass pane 302 may also be formed from photochromic glass compositions. Glass pane 302 may also be formed from a non-photochromic glass and a photochromic glass as laminate with an interface there between. In embodiments, one surface of glass pane 302 is formed from non-photochromic glass and the opposite surface is formed from photochromic glass. In another embodiment of window 100, low emissivity layer 310 is provided at the interface, between the non-photochromic glass and photochromic glass laminate in pane 302. In another embodiment, low emissivity layer could be provided in any location between surfaces 304 and 306.

Glass pane 302 in window 100 may help to further insulate photochromic glass of glass pane 202 from the outside ambient temperatures. Alternatively, glass pane 302 may include photochromic glass, non-photochromic glass, and/or a low emissivity composition, each independent or any combination of the three as a laminate. In the FIG. 7 embodiment, pane 202 is a laminate of a photochromic glass, a soda-lime glass, and a low emissivity layer 210. The photochromic glass forms surface 204 and the soda-lime glass forms surface 206 with layer 210 thereon. This embodiment may provide a window solution for particularly hot and/or cold climates. Accordingly, photochromic glass forming surface 204 is insulated from outside temperatures by glass panes 108, 308, low emissivity layer 110, and spaces 402, 403. For cold climates, layer 210 and interface 250 may reflect inside heat back inside or may act as a UV blocking layer capable of selectively reflecting and/or absorbing UV wavelengths from inside the structure.

Figure 5:
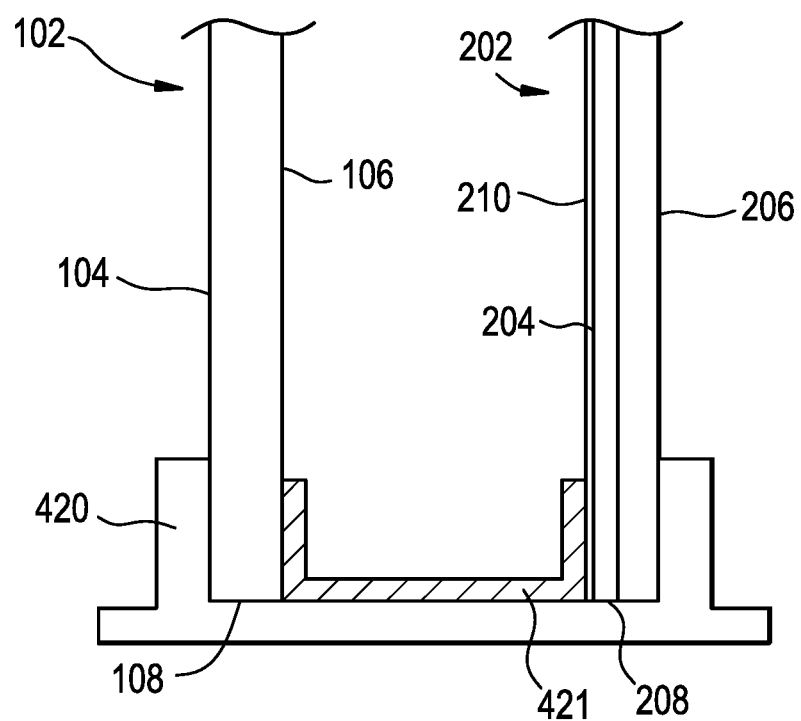

FIG. 5 provides an embodiment where outside glass pane 102 does not include a low emissivity layer. Instead, layer 210 is provided on surface 204 of pane 202 comprising the photochromic glass. This embodiment may be particularly suited for temperate climates where more heat insulation is needed. The coating selectively reflects IR and NIR wavelengths (potentially heating space 401) to minimize heat transfer to the photochromic glass.

In one aspect of the present disclosure, a window comprising an outside glass pane and an inside glass pane is disclosed. In embodiments, the outside glass pane is for interaction with outdoors. In embodiments, the outside glass pane comprises a low emissivity layer. In embodiments, the outside glass pane includes opposite surfaces and an outer edge. In embodiments, the outside glass pane reflects light having a wavelength from about 701 nm to about 2,000 nm and transmits light having a wavelength from about 350 nm to about 700 nm. In embodiments, the inside glass pane is for interaction with indoors. In embodiments, the inside glass pane comprises a photochromic glass. In embodiments, the inside glass pane comprises opposite surfaces and an outer edge. In embodiments, the inside glass pane is spaced apart from and disposed substantially parallel to the outside glass pane. In embodiments, light having a wavelength from about 350 to about 700 nm transmitted by the outside glass pane contacts the inside glass pane and darkens the photochromic glass. In embodiments, light having a wavelength from about 350 to about 700 nm reduces visible light transmittance through the photochromic glass by about 20% or more.

In another aspect of the present disclosure, a window comprising an outside glass pane and an inside glass pane is disclosed. In embodiments, the window comprises an external glass pane adjacent the building exterior and an internal glass pane adjacent the building interior. In embodiments, the external glass pane comprises first and second opposite surfaces and an outer edge and is formed from a first glass including a low emissivity layer. In embodiments, the outside glass pane reflects light from the building exterior having a wavelength from about 701 nm to about 2,000 nm and transmits light from the building exterior having a wavelength from about 350 nm to about 700 nm. In embodiments, the inside glass pane comprises first and second opposite surfaces and an outer edge and a photochromic glass as a laminate on a second glass. In embodiments, the inside glass pane is spaced apart from and disposed substantially parallel to the outside glass pane by a distance. In embodiments, light having a wavelength from about 350 to about 700 nm transmitted by the outside glass pane contacts the inside glass pane and darkens the photochromic glass.

In yet another aspect of the present disclosure, a window comprising an external glass pane and an internal glass pane is disclosed. In embodiments, the external glass pane comprises a first surface opposite a second surface and a first outer edge. In embodiments, the outside glass pane includes a low emissivity layer. In embodiments, the first surface of the outside glass pane is adjacent the building exterior. In embodiments, the outside glass pane reflects light from the building exterior including a wavelength from about 701 nm to about 2,000 nm. In embodiments, the outside glass pane transmits light from the building exterior including a wavelength from about 350 nm to about 700 nm. In embodiments, inside glass pane comprises a first surface opposite a second surface and a second outer edge. In embodiments, the second glass pane comprises a photochromic glass. In embodiments, the inside glass pane is adjacent the building interior. In embodiments, the inside glass pane is spaced apart from and disposed substantially parallel to the outside glass pane. In embodiments, light having a wavelength from about 350 nm to about 700 nm transmitted by the outside glass pane contacts the inside glass pane and darkens the photochromic glass to reduce visible light transmittance through the photochromic glass by about 50% or more.

Methods of making window 100 are also disclosed herein. Methods of making window 100 include arranging outside glass pane 102 relative to inside glass pane 202 within a frame 420. In embodiments, frame 420 includes an overhanging portion configured to interfere with an edge of an opening in a building or enclosure and to prevent window 100 from being installed in the building or enclosure such that outside glass pane 102 is adjacent the building interior.

Methods of installing window 100 are also disclosed herein. Methods of installing window 100 include arranging outside glass pane 102 relative to inside glass pane 202 in frame 420 such that outside glass pane 202 is adjacent an outdoor environment or building exterior and inside glass pane 102 is adjacent an indoor environment or building interior. Methods of installing window 100 also include sealing window 100 contiguous frame 420 within an opening of a building or enclosure.

As used herein, the singular forms "a," "an," and "the" include plural referents unless the context clearly dictates otherwise. Ranges can be expressed herein as from "about " one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of this disclosure may occur to persons skilled in the art, the present disclosure should be construed to include everything within the scope of the appended claims and their equivalents.

What is claimed is:

1. A window comprising:
   an outside glass pane for interaction with outdoors comprising a low emissivity layer that transmits actinic radiation,
   an inside glass pane for interaction with indoors comprising a photochromic glass and a non-photochromic glass separated by a low emissivity interface positioned therebetween,
   the inside glass pane is spaced apart from and disposed substantially parallel to the outside glass pane, and
   the actinic radiation transmitted by the outside glass pane and low emissivity layer reduces visible light transmittance through the photochromic glass.

2. The window of claim 1 wherein the outside glass pane reflects light comprising a wavelength from 701 nm to 2000 nm, and transmits light comprising a wavelength from 350 nm to 700 nm.

3. The window of claim 2 wherein the actinic radiation transmitted by the outside glass pane and low emissivity layer comprises a wavelength from 350 nm to 420 nm.

4. The window of claim 2 wherein the actinic radiation transmitted by the outside glass pane and low emissivity layer contacts the photochromic glass to reduce visible light transmittance there through by 40% or more.

5. The window of claim 1 wherein visible light transmittance through the photochromic glass reduces when the photochromic glass is at room temperature.

6. The window of claim 1 wherein the low emissivity layer comprises metallic silver, metallic nickel, silicon nitride, tin oxide, zirconium oxide, zinc oxide, or combinations thereof.

7. The window of claim 1 wherein the outside glass pane comprises a soda-lime glass, an aluminosilicate glass, a borosilicate glass, or combinations thereof.

8. The window of claim 1 wherein the photochromic glass comprises, in terms of weight percent: $SiO_2$ 54-66; $Al_2O_3$ 7-15; $B_2O_3$ 10-25; $Li_2O$ 0.5-4; $Na_2O$ 1-15; $K_2O$ 0-12; $ZrO_2$ 0-6; $TiO_2$ 0-3; PbO 0-1; Ag 0.1-1; Cl 0.1-1; Br 0-3; CuO 0.006-0.02; $Sb_2O_3$ 0-0.2; $SnO_2$ 0-0.2; $CeO_2$ 0-2.5; and F 0-2.5.

9. The window of claim 1 wherein the outside glass pane is spaced apart from the inside glass pane by an insulating gas.

10. The window of claim 1 wherein the outside glass pane is spaced apart from the inside glass pane by a first distance.

11. The window of claim 10 wherein the first distance between the outside and inside glass panes is from 5 mm to 25 mm.

12. The window of claim 1 wherein the photochromic glass transmits ≥20% of visible light that contacts the outside glass pane there through when visible light transmittance through the photochromic glass is reduced.

13. The window of claim 1 wherein the low emissivity interface extends between and contacts both the photochromic glass and the non-photochromic glass of the inside glass pane.

14. The window of claim 13 wherein the non-photochromic glass comprises a soda-lime glass, an alurninosilicate glass, a borosilicate glass, or combinations thereof.

15. The window of claim 13 further comprising a low emissivity layer on a surface of the non-photochromic glass of the inside glass pane opposite the low emissivity interface.

16. The window of claim 1 further comprising a third glass pane,
   the third glass pane spaced apart from and disposed substantially parallel to the outside glass pane by a second distance, and
   the third glass pane spaced apart from and disposed substantially parallel to the inside glass pane by a third distance.

17. The window of claim 16 wherein the third glass pane comprises a low emissivity coating or a photochromic glass.

18. A method of installing the window of claim 1 comprising:
   arranging the outside glass pane relative to the inside glass pane,
   wherein the outside glass pane is adjacent a building exterior and the inside glass pane is adjacent the building interior.

19. A window comprising:
   an external glass pane comprising a low emissivity layer, the external glass pane transmits solar light from a building exterior comprising actinic radiation,
   an internal glass pane comprising a photochromic glass and a non-photochromic glass separated by a low emissivity interface, the internal glass pane is spaced apart from and disposed substantially parallel to the external glass pane, and
   the actinic radiation transmitted by the external glass pane darkens the photochromic glass and reduces visible light transmittance through the photochromic glass.

20. The window of claim 19 wherein the low emissivity layer reflects light comprising a wavelength from 701 nm to 2000 nm.

21. The window of claim 19 wherein the actinic radiation transmitted by the external glass pane and low emissivity layer contacts the photochromic glass to reduce visible light transmittance there through by 40% or more.

22. The window of claim 19 wherein visible light transmittance through the photochromic glass reduces for room temperature photochromic glass.

23. The window of claim 19 wherein the low emissivity layer transmits ≤20% of infrared light contacting the external glass pane.

24. The window of claim 19 wherein the photochromic glass transmits ≤35% of visible light that contacts the external glass pane when darkened.

25. The window of claim 19 wherein the external glass panes comprises soda-lime glass.

26. The window of claim 19 further comprising a spacer between the external glass pane and the internal glass pane.

27. The window of claim 26 wherein the spacer is one of an edge seal formed around at least respective portions of the external and internal glass panes, a metallic pillar, or a glass bump formed integrally in the external or internal glass pane.

28. The window of claim 19, wherein the actinic radiation comprises a wavelength from 350 nm to 420 nm.

29. A building including a multi-pane window installed between an interior and an exterior of the building, the window comprising:
   an exterior glass pane comprising a low emissivity layer, the exterior glass pane and low emissivity layer transmit actinic radiation from the building exterior,
   an interior glass pane comprising a photochromic glass, a non-photochromic glass, and an interface disposed therebetween including low emissivity composition, the interior glass pane is spaced apart from and disposed substantially parallel to the exterior glass pane, and
   the actinic radiation transmitted by the exterior glass pane activates the photochromic glass to reduce visible light transmittance through the photochromic glass by 40% or more.

30. The building of claim 29, wherein the actinic radiation comprise a wavelength from 350 nm to 420 nm.

* * * * *

UNITED STATES PATENT AND TRADEMARK OFFICE
CERTIFICATE OF CORRECTION

PATENT NO. : 10,393,934 B2
APPLICATION NO. : 15/259572
DATED : August 27, 2019
INVENTOR(S) : Borrelli Nicholas Francis et al.

Page 1 of 1

It is certified that error appears in the above-identified patent and that said Letters Patent is hereby corrected as shown below:

In the Claims

In Column 14, Line 32 (approx.), Claim 14, delete "alurninosilicate" and insert -- aluminosilicate --, therefor.

Signed and Sealed this
Thirty-first Day of December, 2019

Andrei Iancu
*Director of the United States Patent and Trademark Office*